United States Patent
Vissamsetty et al.

(10) Patent No.: US 10,250,636 B2
(45) Date of Patent: Apr. 2, 2019

(54) DETECTING MAN-IN-THE-MIDDLE ATTACKS

(71) Applicant: Attivo Networks Inc., Fremont, CA (US)

(72) Inventors: Venu Vissamsetty, San Jose, CA (US); Muthukumar Lakshmanan, Bangalore (IN); Sreenivasa Sudheendra Penupolu, Andhra Pradesh (IN); Ankur Rungta, Bangalore (IN)

(73) Assignee: ATTIVO NETWORKS INC, Fremont, CA (US)

( * ) Notice: Subject to any disclaimer, the term of this patent is extended or adjusted under 35 U.S.C. 154(b) by 264 days.

(21) Appl. No.: 15/204,779

(22) Filed: Jul. 7, 2016

(65) Prior Publication Data

US 2018/0013788 A1    Jan. 11, 2018

(51) Int. Cl.
*H04L 29/06* (2006.01)
*G06F 7/04* (2006.01)

(52) U.S. Cl.
CPC .......... *H04L 63/1466* (2013.01); *H04L 63/08* (2013.01); *H04L 63/1416* (2013.01); *H04L 2463/144* (2013.01)

(58) Field of Classification Search
CPC ... H04L 63/062; H04L 63/08; H04L 63/1416; H04L 63/1466; H04L 63/1491; H04L 63/1441; H04L 63/1408; H04L 43/12; H04L 61/1511; H04L 29/12066; G06F 21/556; G06F 21/552; G06F 21/554; H04W 12/12

See application file for complete search history.

(56) References Cited

U.S. PATENT DOCUMENTS

| | | | |
|---|---|---|---|
| 7,596,808 B1 * | 9/2009 | Wilkinson | H04L 63/0272 709/223 |
| 8,839,369 B1 * | 9/2014 | Dai | H04L 63/10 713/178 |

(Continued)

OTHER PUBLICATIONS

Barbhuiya, Ferdous A., Santosh Biswas, and Sukumar Nandi. "Detection of neighbor solicitation and advertisement spoofing in IPv6 neighbor discovery protocol." Proceedings of the 4th international conference on Security of information and networks. (Year: 2011).*

(Continued)

*Primary Examiner* — Michael Simitoski
(74) *Attorney, Agent, or Firm* — David R. Stevens; Stevens Law Group

(57) ABSTRACT

MITM attacks are detected by intercepting network configuration traffic (name resolution, DHCP, ARP, ICMP, etc.) in order to obtain a description of network components. A computer system generates artificial requests for network configuration information and monitors responses. Multiple responses indicate a MITM attack. Responses that are different from previously-recorded responses also indicate a MITM attack. MITM attacks may be confirmed by transmitting fake credentials to a source of a response to a request for network configuration information. If the fake credentials are accepted or are subsequently used in an access attempt, then a MITM attack may be confirmed.

20 Claims, 11 Drawing Sheets

(56) References Cited

U.S. PATENT DOCUMENTS

| | | | | |
|---|---|---|---|---|
| 8,880,435 B1* | 11/2014 | Catlett | ................... | G06Q 20/10 |
| | | | | 705/75 |
| 9,009,829 B2* | 4/2015 | Stolfo | ................... | G06F 21/554 |
| | | | | 726/23 |
| 9,602,531 B1* | 3/2017 | Wallace | .............. | H04L 63/1433 |
| 2007/0177499 A1* | 8/2007 | Gavrilescu | .......... | H04L 43/0811 |
| | | | | 370/229 |
| 2009/0254973 A1* | 10/2009 | Kwan | ................ | H04L 63/0236 |
| | | | | 726/2 |
| 2010/0299430 A1* | 11/2010 | Powers | .............. | H04L 12/2809 |
| | | | | 709/224 |
| 2011/0078309 A1* | 3/2011 | Bloch | ............... | H04L 29/12066 |
| | | | | 709/224 |
| 2012/0084866 A1* | 4/2012 | Stolfo | ................... | G06F 21/554 |
| | | | | 726/25 |
| 2013/0212658 A1* | 8/2013 | Amaya Calvo | ..... | H04L 63/1441 |
| | | | | 726/6 |
| 2015/0358345 A1* | 12/2015 | Clark | ................. | H04L 63/1433 |
| | | | | 726/25 |
| 2016/0315909 A1* | 10/2016 | von Gravrock | ....... | H04L 12/283 |
| 2017/0230384 A1* | 8/2017 | Touboul | .............. | H04L 63/1416 |
| 2017/0244749 A1* | 8/2017 | Shulman | .............. | H04L 63/1441 |
| 2017/0244755 A1* | 8/2017 | Tsao | ....................... | H04L 63/083 |
| 2017/0279846 A1* | 9/2017 | Osterweil | ........... | H04L 63/1441 |
| 2017/0346853 A1* | 11/2017 | Wyatt | ..................... | H04L 43/12 |
| 2018/0027017 A1* | 1/2018 | Touboul | .............. | H04L 63/1491 |
| 2018/0048665 A1* | 2/2018 | Shulman | .............. | H04L 63/1425 |

OTHER PUBLICATIONS

Chen, Qi Alfred, et al. "MitM attack by name collision: Cause analysis and vulnerability assessment in the new gTLD era." Security and Privacy (SP), 2016 IEEE Symposium on. IEEE, 2016. (Year: 2016).*

Ornaghi, Alberto, and Marco Valleri. "Man in the middle attacks." Blackhat Conference Europe. 2003. (Year: 2003).*

Ramachandran, Vivek, and Sukumar Nandi. "Detecting ARP spoofing: An active technique." International Conference on Information Systems Security. Springer, Berlin, Heidelberg, 2005. (Year: 2005).*

Ullrich, J., et al. "IPv6 Security: Attacks and Countermeasures in a Nutshell." (2015). (Year: 2015).*

* cited by examiner

DETECTING MAN-IN-THE-MIDDLE ATTACKS

BACKGROUND

The man-in-the-middle (MITM) attack is a popular form of attack where the attacker intercepts network packets from systems and either directly responds to them or relays them after stealing or manipulating the content. Some of the popular protocols using broadcast/multicast that are vulnerable to MITM attacks include Net BIOS (basic input output system) Name Service (NBNS) traffic, Link-Local Multicast Name Resolution (LLMNR) traffic, and Multicast Domain Name System (mDNS) traffic. Other vulnerable protocols include address resolution protocol (ARP) and dynamic host configuration protocol (DHCP).

NBNS, LLMNR, and mDNS are protocols used to do name resolution of resources within a network. They are used as a fallback mechanism when DNS (domain name service) resolution fails. NBNS and LLMNR are used in WINDOWS while mDNS is used in OS X. NBNS uses UDP (user datagram protocol) broadcast while LLMNR and mDNS use UDP multicast. The UDP messages are easy to spoof and an attacker can easily perform man-in-the-middle attacks. Popular attacks exploiting these protocols are WPAD (web proxy autodiscovery protocol) poisoning and SMB (server message block) relay attacks that use MITM for credential harvesting.

WPAD is a mechanism used by Windows to get the proxy settings. On a corporate network, a DNS entry for "WPAD" should point to a proxy server that hosts a "wpad.dat" file. If DNS fails, the client resorts to NBNS broadcast to resolve "WPAD." An attacker computer on the same broadcast network can respond for the "WPAD" queries and force all HTTP traffic to pass through the attacker computer. An attacker can also force authentication when a client tries to fetch the WPAD.dat file using which the attacker can capture the credentials.

ARP poisoning is another common technique used by attackers to do MITM attack for unicast protocols. ARP poisoning can be done in multiple ways. The attacker identifies the default gateway in the subnet the attacker is in and responds with the attacker's MAC (machine access code) address when the attacker sees ARP requests to the gateway. This poisons the ARP cache on end hosts and packets are sent to the attacker instead of the gateway. Another technique is to send unsolicited ARP replies to the target using spoofed IP addresses. If the target has an entry in the ARP cache for the spoofed IP address, it is poisoned with the attacker's MAC address. The attacker can then do man-in-the-middle interception to steal information of interest like credentials, PII (personally identifiable information), and the like. The attacker can either directly respond to them or relay them after consuming and/or modifying the content. ARP poisoning can also be done by sending fake gratuitous ARP packets. The attacker can send a gratuitous ARP packet indicating that the gateway MAC has been changed to the attacker's MAC address. End hosts that have an entry for the default gateway update their ARP table with the attacker's MAC for the default gateway.

By installing a rogue DHCP server in the network, an attacker can control the almost all network activity. The rogue DHCP server can be configured with the attacker machine as the default gateway and the DNS server. This will force all network traffic from end hosts which obtain IP from the rogue DHCP server to pass through the attacker or use the attacker for DNS resolutions.

Other protocols that are susceptible to man-in-the-middle attacks are SLP (service location protocol) and SSDP (simple service discovery protocol) which can be exploited by attackers to steal information.

All the above mentioned attacks can be exploited at subnet (VLAN) and cannot be detected if security devices are deployed at perimeter (e.g. by a Firewall or internet provider security (IPS)).

The systems and methods disclosed herein provide an improved approach for detecting MITM attacks using the above mentioned protocols.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
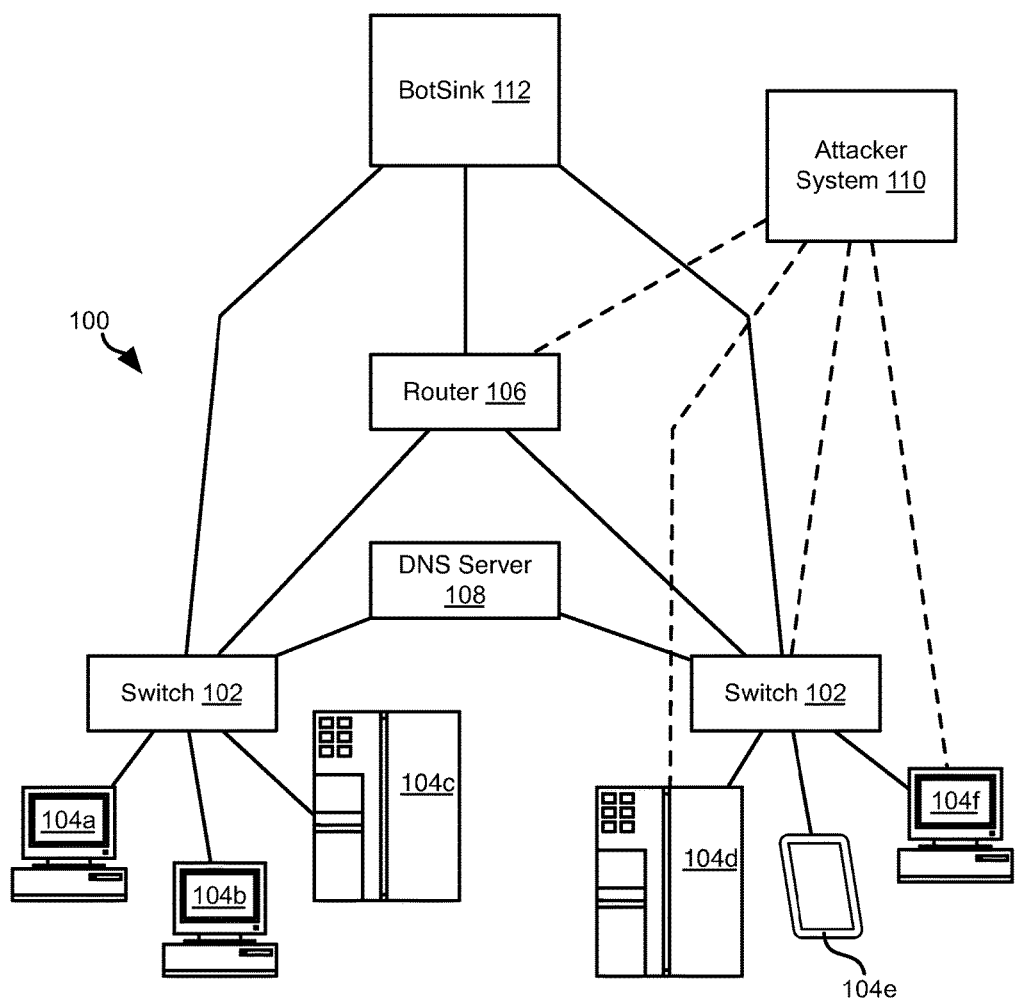
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network 100 may include various subnets such as virtual local area networks (VLANs), local area networks (LANs), or other portion of a corporate network. The network 100 may include various switches 102 coupled to various nodes 104a-104f of the network 100. For example, each subnet may include a switch 102 routing traffic among nodes of the subnet. In some embodiments, a switch 102 may route packets among nodes 104a-104f of a subnet and perform any other function of a switch known in the art.

One or more switches 102 and/or nodes 104a-104f may be coupled to a router 106. The router 106 receives packets from a node 104a-104f in one subnet that is addressed to a node 104a-104f of another subnet and routes the packets to the addressed nodes. Each switch 102 may be coupled to the router 106 or include a router 106 for routing packets external to the subnet including the switch 102.

In some embodiments, the network 100 further includes one or more DNS servers 108. As known in the art a DNS server resolves domain names to internet protocol (IP) addresses in response to name resolution requests from nodes 104a-104f or router 106 of the network 100.

An attacker system 110 may obtain access to subnet and may infiltrate any of the illustrated components, such as router 106, node 104d, 104f or other component. Likewise, the attacker system 110 may obtain access to a subnet and impersonate any of the illustrated components. For purposes of this disclosure actions ascribed to the attacker system 110 may refer to actions performed by the attacker system 110 or a node 104a-104f of the network that is executing malicious code provided by the attacker system 110.

A BotSink 112 may implement methods as described herein for detecting actions of the attacker system 110, particularly MITM attacks. To facilitate this, the BotSink 112 may have a presence in one or more subnets, e.g. be assigned an address in a subnet and have a data connection to a component of a subnet, such as a switch 102, router 106, or other network component. In some embodiments, the BotSink 112 may be coupled to a trunking port of one or more switches 102 in order to monitor traffic being handled by the switches 102.

The configuration of the network 100 is a simple illustration of a basic network architecture. The methods disclosed herein may be used in a similar manner for any other type of network including any number of subnets.

Figure 2A:
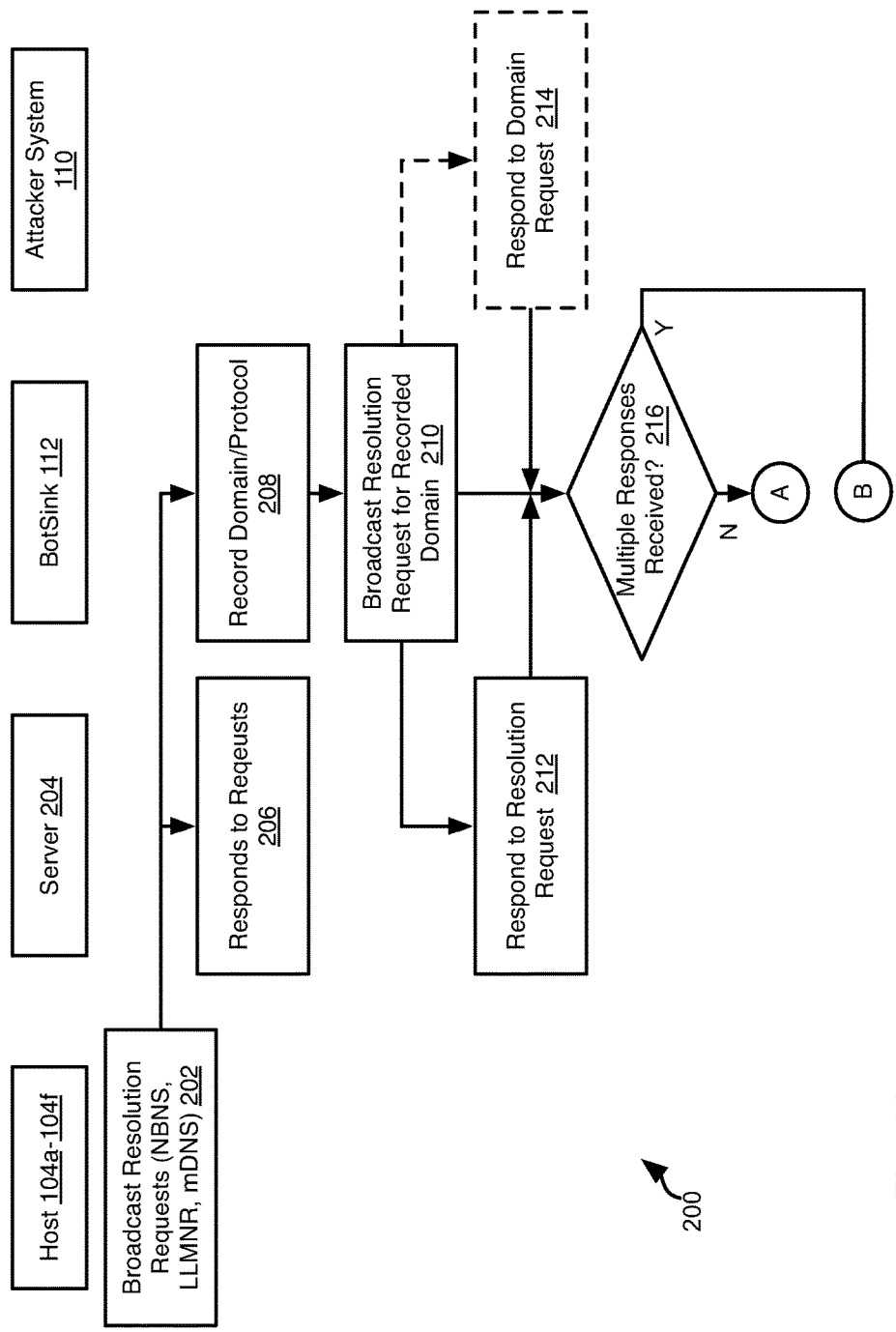
FIGS. 2A to 2C are process flow diagrams of a method for detecting MITM attacks using name resolution protocols in accordance with an embodiment of the present invention.
Figure 2B:
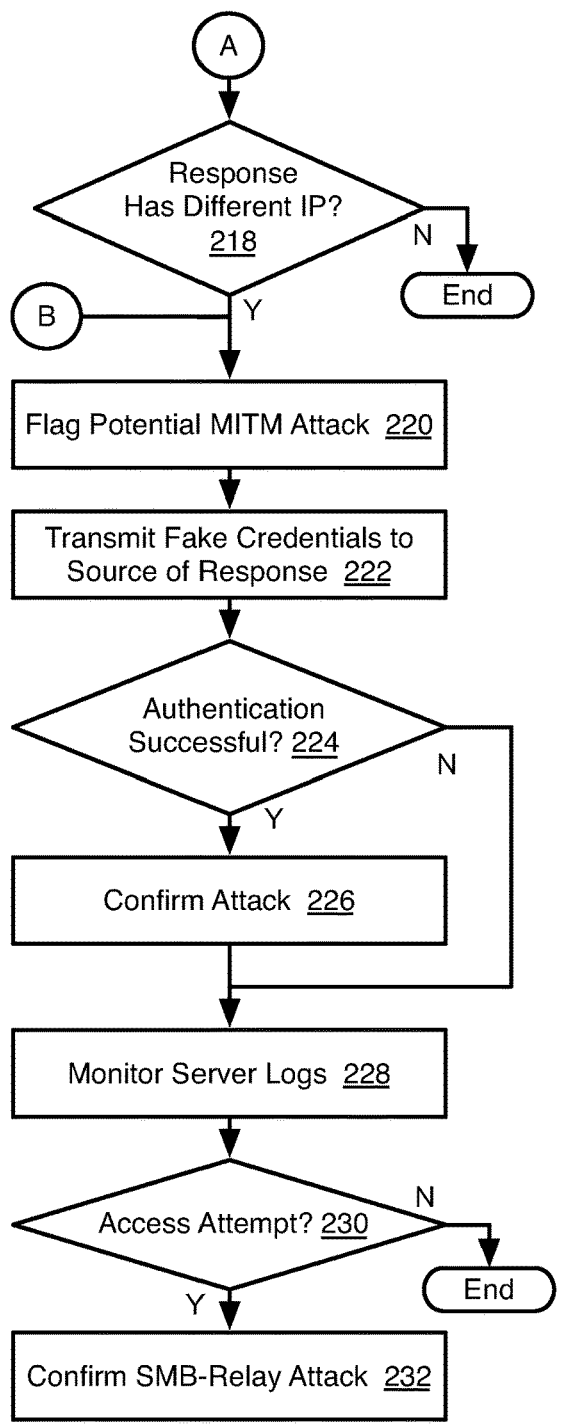
Figure 2C:
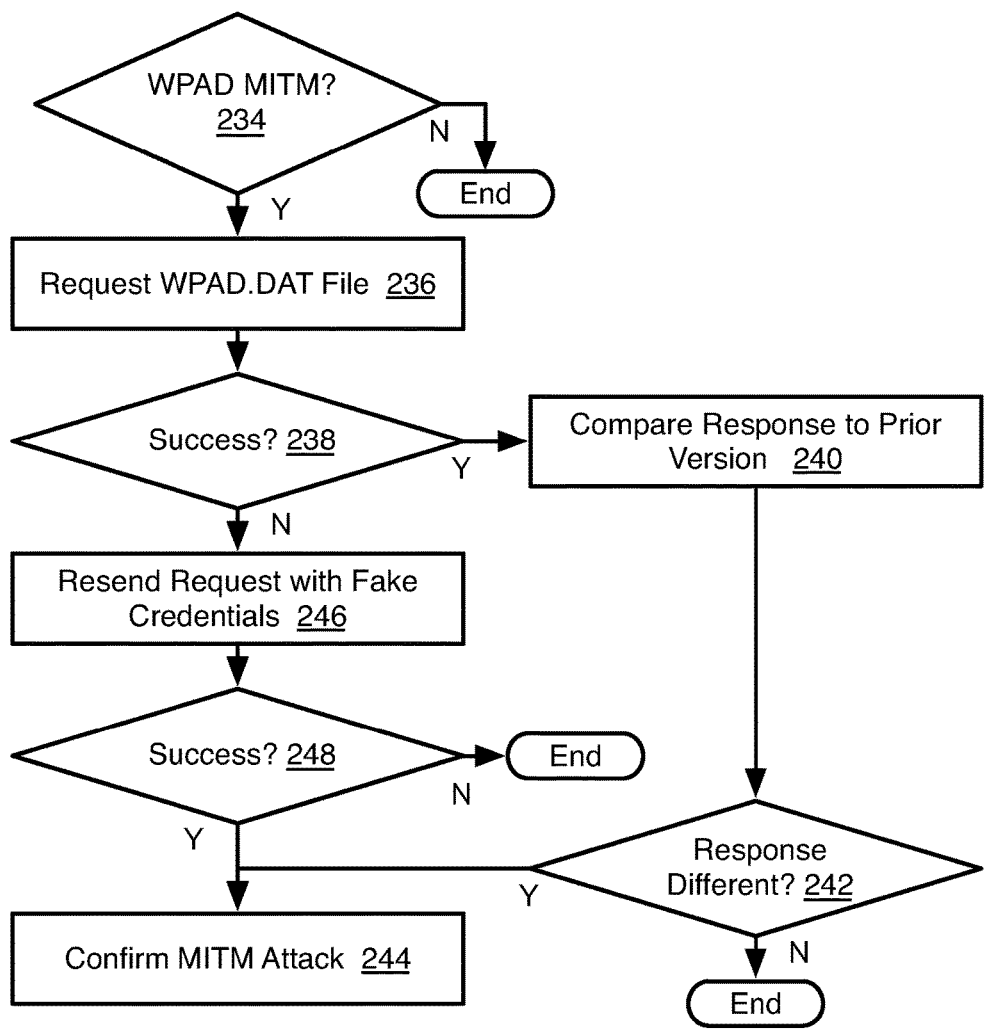

Referring to FIGS. 2A to 2C. The illustrated method 200 may be used to detect MITM attacks where an attacker attempts to imitate a name resolution protocol such as NBNS, LLMNR, mDNS, or other name resolution protocol. The method 200 may include broadcasting 202 domain requests by one or more hosts 104a-104f of a subnet. The domain requests may include some or all of NBNS, LLMNR, and mDNS requests. A server 204 having an address within the subnet receives the resolution request and responds 206 to the requests, such as by returning an IP address for a domain referenced in the requests to the host 104a-104f that issued the request.

Inasmuch as the resolution requests of step 202 are broadcast, any node on the same subnet will receive the request. However, the responses are generally unicast such that only the sender of the request receives the response. The BotSink 112 may acquire an IP address in some or all of the subnets of a network 100 such that it may receive these broadcast resolution request. Upon receiving a resolution request, the BotSink 112 may record 208 a domain referenced in the resolution request and the protocol (NBNS, LLMNR, mDNS) using which the request was transmitted. Accordingly, over time, the BotSink 112 will have, for each subnet for which it has acquired an IP address, a list of domains and protocols from resolution requests received over a period of time. In some embodiments, the BotSink 112 may not have acquired IP addresses for a network but may monitor broadcast traffic by way of the trunking port of a switch 102 to which hthe BotSink 112 is coupled in order to receive the broadcast traffic of step 202.

The method 200 may further include broadcasting 210, by the BotSink 112, resolution requests referencing domains recorded at step 208 in the corresponding subnets. Step 210 may be performed only for domains that are actively being queried, i.e. a domain for which a resolution request 202 has been received within some minimum time period, e.g. 2-3 hours. Recorded domain names and protocols may be deleted if no resolution request referencing the domain are received within the minimum time period. Broadcasting 210 resolution requests may be performed at random (e.g. pseudo random) intervals in order to appear as production traffic.

Broadcasting 210 a resolution request for a domain may include broadcasting the resolution on the subnet and using the same protocol as a prior request referencing that domain as recorded at step 208. In response to such requests, the server 204 for the subnet will respond 212 with an IP address for the domain included in the request. If an attacker system 110 has access to the network traffic of the subnet, it may also respond 214 to the domain request.

The BotSink 112 may evaluate 216 whether multiple responses to the request of step 210 were received, i.e. multiple responses receieved without any intervening request. Multiple responses may be determined 216 to have been received if they are received within some threshold time limit from one another, e.g. 2 to 100 ms, of one another.

Referring to FIG. 2B, if a single response is found 216 to have been received, the method 200 may include evaluating 218 whether the response includes a different IP address for the domain. In particular, each time a request is broadcast 210 is made, the response may be recorded, i.e. as a mapping between the domain of the request and the address received in response to it. Step 210 may be performed periodically at random intervals for each recorded domain name for each subnet. Accordingly, even if multiple responses are not received, if a single response is found to resolve a domain to a different address than the response to a prior request for the domain, then the method 200 may include flagging 220 a potential MITM attack occuring for the subnet.

If multiple responses are found 216 to have been received from different IP addresses for a resolution request broadcast 210 on a subnet, then a potential MITM attack is also flagged 220.

In either case, the method 200 may include transmitting 222 fake credentials to a source of a response to the resolution request of step 210. In some embodiments, step 222 and subsequent steps are performed the first time a domain is detected, i.e. the first time a domain is detected by the BotSink 112 in a resolution request sent by a host 104a-104f of a subnet, step 222 will be performed regardless of whether multiple responses are found 216 to have been received or a response is found 218 to have a conflicting IP address.

Likewise, if a domain name has been inactive for threshold inactivity period, e.g. 24 hours, and becomes active again, a potential MITM attack may be flagged 220 and steps 222 and the following steps may be executed in response to detecting this returning to activity following a period of inactivity longer than the threshold inactivity period. A domain name may be determined to be inactive if name resolution requests transmitted by the BotSink 112 for that domain name are unsuccessful throughout the inactivity period. A domain name may be deemed to have become active when a successful response is received for a domain resolution request referencing the domain name.

In some embodiments, if multiple domain names that are subject to separate resolution requests of step 210 are determined to be resolved to the same IP address in any responses 212, 214 received in response to the requests, a potential MITM attack is flagged 220 and steps 222 and the following steps are executed in response. In some embodiments, if responses 212, 214 to different requests 210 for different domain names resolve to the same IP address, an MITM attack is highly likely, such that remedial actions will be taken in response, as described hereinbelow, without first confirming an MITM attack by performing step 222 and the subsequent steps of the method 200. Remedial action may be taken with respect to a source of the responses that resolved different domain names to the same IP address.

Transmitting 222 fake credentials may include transmitting 222 the fake credentials to the source IP address of a response to the request transmitted at step 210. The fake credentials may include a username, password, digital certificate, public key, or any other information that a user or computer may use to perform authentication. The credentials are fake in the sense that they are not credentials for any actual host 104a-104f of the network 100, for any user account, or for any other device in the network 100. The credentials may include content such that they appear genuine. For example, transmitting 222 fake credentials may include attempting to authenticate the BotSink 112 with respect to one or both of SMB (server message block) and HTTP (hyper text transfer protocol) services using the fake credentials. In other embodiments, transmitting 222 fake credentials may include attempting to authenticate the BotSink 112 with respect to a different network service, such as LDAP (lightweight directory access protocol), MySQL (My Structured Query Language), SMTP, FTP (file transfer protocol), or the like The method 200 may include evaluating 224 whether authentication using the fake credentials was successful. If the authentication is found 224 to have been successful, then the method 200 may include confirimg 226 that an MITM attack has in fact occurred.

In either case, the method 200 may include monitoring 228 server logs. In particular, logs of one or more services (e.g. HTTP, SMB) offered by one or more servers of the network 100 to determine whether the logs indicate an attempt to login to the server using the fake credentials of step 222. If an access attempt is found 230, then the method method 200 may include confirming 232 that an MITM attack has occurred. For example, use of the credentials to attempt to log into a server may indicate an SMB-relay attack.

If an MITM attack is confirmed 226 or 232, then remedial action may be taken. For example, the process of transmitting credentials to the attacker IP address may continue with multiple sets of fake credentials in order to slow down the attacker. For example, the attacker may be allowed to access the BotSink 112 which may implement virtual machines implementing network services that simulate actual network operation. Remedial action may include performing some or all of the approaches described in the applications listed below, all of which are incorporated herein by reference in their entirety:

U.S. application Ser. No. 14/458,026 filed Aug. 12, 2014, and entitled Distributed System for Bot Detection;

U.S. Pat. No. 9,356,950 issued May 31, 2016, and entitled Evaluating URLS For Malicious Content;

U.S. application Ser. No. 14/549,112 filed Nov. 20, 2014, and entitled System And Method For Directing Malicous Activity To A Monitoring System;

U.S. application Ser. No. 15/157,082 filed May 17, 2016, and entitled Emulating Successful Shellcode Attacks;

U.S. application Ser. No. 14/805,202 filed Jul. 21, 2015, and entitled Monitoring Access Of Network Darkspace;

U.S. application Ser. No. 14/965,574 filed Dec. 10, 2015, and entitled Database Deception In Directory Services;

U.S. application Ser. No. 15/142,860 filed Apr. 29, 2016, and entitled Authentication Incident Detection and Management; and U.S. application Ser. No. 15/153,471 filed May 12, 2016, and entitled Luring Attackers Towards Deception Servers.

Referring to FIG. 2C, the steps of FIG. 2C may be executed where a potential MITM attack is flagged 220. If the protocol of the resolution request transmitted at step 210 is found 234 to be WPAD, then the WPAD.dat file is requested 236 from the source of the response received by the BotSink 112 in response to the request of step 210, which may be the attacker system 110.

If the request is found 238 to be successful, i.e. a WPAD.dat file was returned in response to the request of step 236 ("the second WPAD.dat file"), then the method 200 may include comparing 240 the WPAD.dat file received in response to the request of step 236 to a previously-received verison of WPAD.dat. For example, a previous version received in response to a previous request for the WPAD.dat file ("the first WPAD.dat file"). If the first and second WPAD.dat files are found 242 to be materially different, e.g. point to a different proxy server, then a MITM attack is confirmed 244 and remedial action may be taken with respect to the source of the second WPAD.dat file in the manner described above.

In some instances, the recipient of the request of step 236 may return a "407 Authentication Required Message," or otherwise indicate that the request was unsuccessfule for lack of authorization. In such cases, the request of step 236 will be found 238 to be unsuccessful. The method may therefore include resending 246 the request with fake credentials, e.g. similar to step 222 described above. If the request of 246 is found 248 to be successful, a MITM attack may be confirmed 244 and remedial action may taken with respect to the recipient of the requests of steps 236 and 248 in the manner described above.

If the response is not found 242 to be different or the request with fake credentials was not successful, then an MITM attack is not confirmed. However, other actions may be taken to determine whether an MITM attack has occurred. For example, server logs may be monitored 228 as described above to determine if any access attempts using the credentials of step 246 are found 230. If so, then an MITM attack will be confirmed 232 and remedial action taken in the manner described above.

In some embodiments, if no previous version of WPAD.dat was received by the BotSink 112 for the subnet, then a potiential MITM attack may be flagged in response to receiving the WPAD.dat file for the first time. In response to the flagging of the potential MITM attack, steps 246, 248, and 244 may be performed with respect to a source of the WPAD.dat file to determine whether an MITM attack has occurred. In some embodiments, in response to the flagging of the potential MITM attack, the processing of step 222 and subsequent method steps of FIG. 2B may additionally or alternatively be performed with respect to the source of the WPAD.dat file In some embodiments, if a successful request for WPAD.dat is received in a subnet following a period greater than a threshold inactivity period, e.g. 24 hours, during which requests for WPAD.dat in the subnet have been unsuccessful, a potential MITM attack may be flagged. In response to flagging of the potential MITM attack, steps 246, 248, and 244 may be performed with respect to a source of the WPAD.dat file to determine whether an MITM attack has occurred. In some embodiments, in response to flagging of the potential MITM attack, the processing of step 222 and subsequent method steps of FIG. 2B may additionally or alternatively be performed with respect to the source of the WPAD.dat file.

Figure 3A:
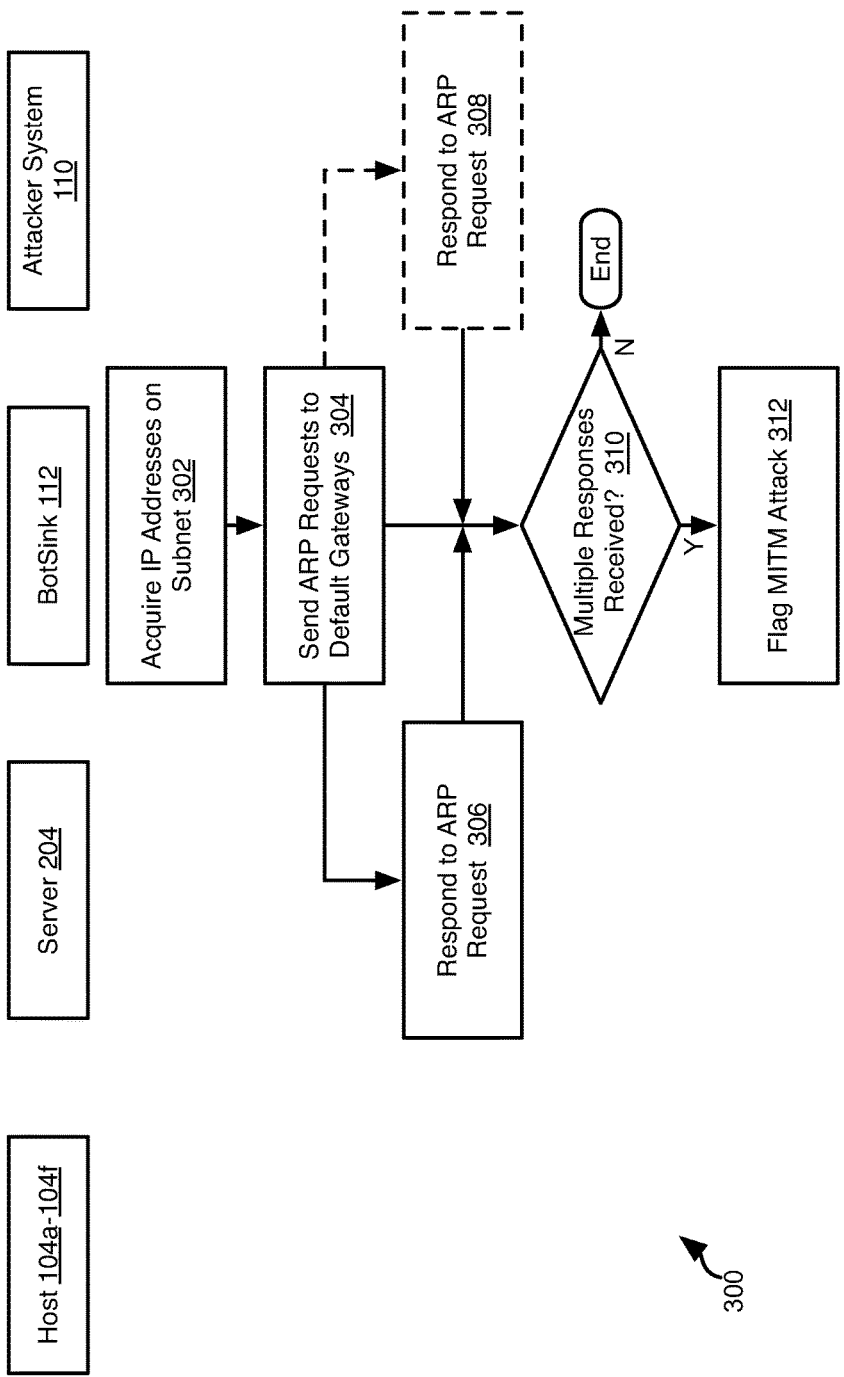
FIGS. 3A to 3D are process flow diagrams of a method for detecting ARP MITM attacks in accordance with an embodiment of the present invention.
Figure 3B:
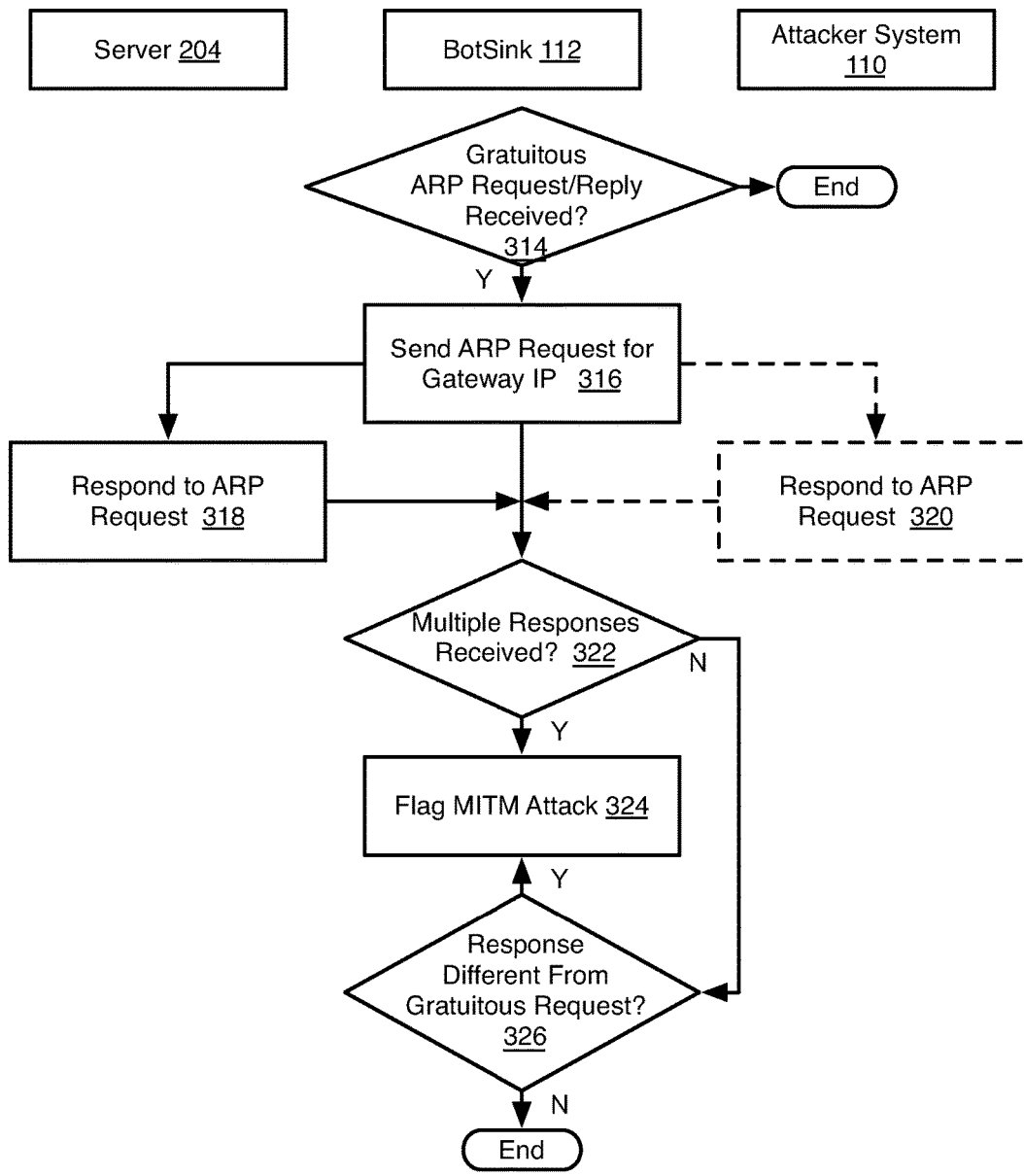
Figure 3C:
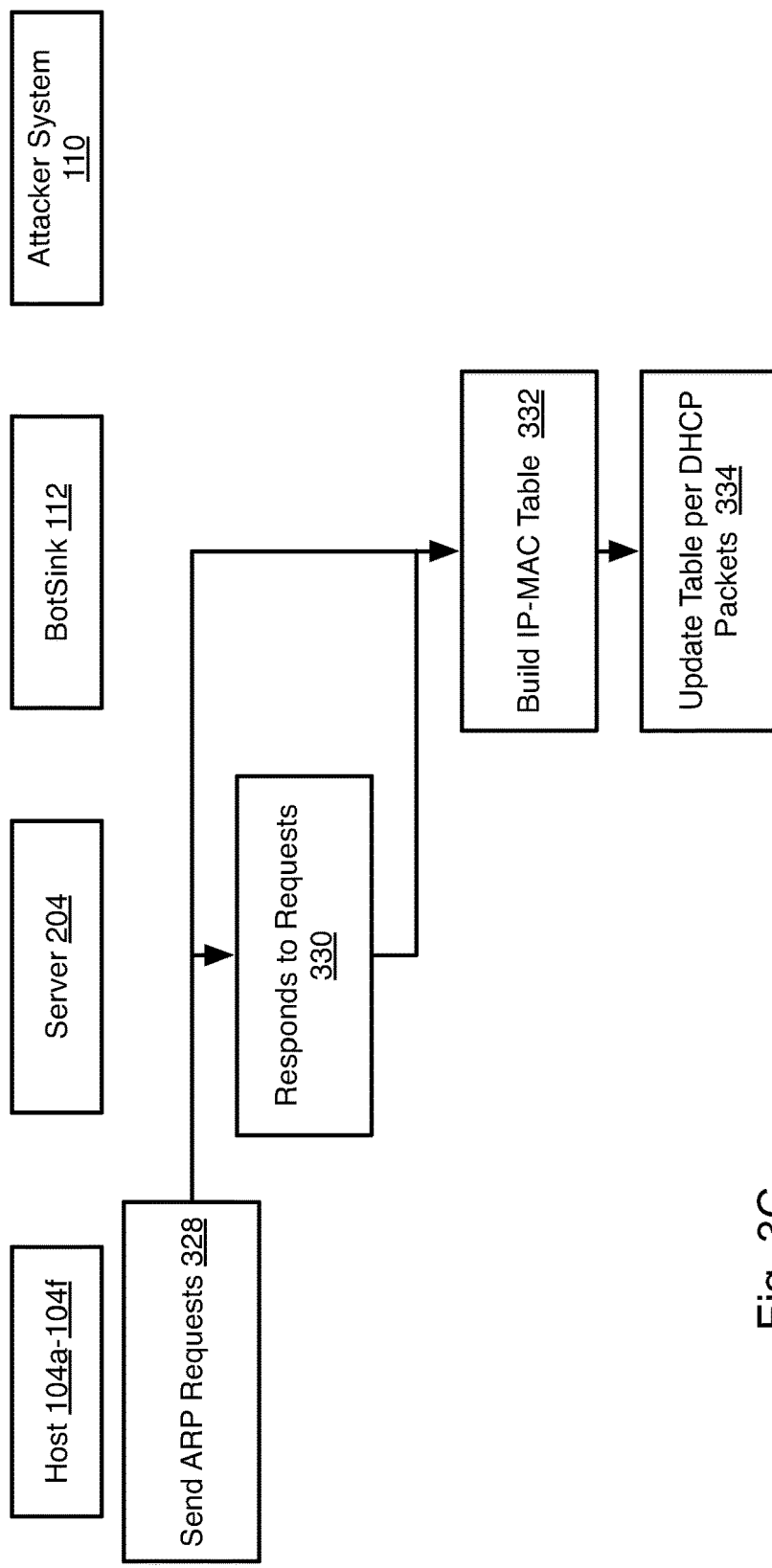

Referring to FIG. 3A to 3C, the illustrated method 300 may be used to detect MITM attacks using ARP requests. The method 300 may be executed for each subnet ("the subnet") of multiple subnets for which the BotSink 112 receives traffic.

The method 300 may include acquiring 302 an IP address for the subnet and sending 304 an ARP request to the default gateway of the subnet. Sending 304 the request may include sending a broadcast ARP request. ARP requests may be transmitted at random intervals in orer to appear as production traffic. The default gateway server 204 responds 306 to the ARP request with its IP address. An attacker system 110 on the subnet may also respond 308 to the ARP with its own IP address.

The method 300 may include evaluating 310 whether multiple responses were received, e.g. multiple responses received without an intervening ARP request or within a threshold period from one another, e.g. 2 to 100 ms. If so, then an MITM attack is flagged 312 on the subnet. Any of the remedial actions described herein may be taken with respect to the source of the second response. In particular, of the multiple responses received, the response with the newer MAC address is flagged as originating from the attacker system 110. For example, the BotSink 112 may receive a correct MAC address of the default gateway at the time of acquiring an IP address on the subnet. Accordingly, upon determining 310 that multiple responses were received, the response with a MAC address differing from the correct MAC address may be determined to be from the attacker system 110.

Referring to FIG. 3B, the method 300 may include evaluating 314 whether a gratuitous ARP request or gratuitous ARP reply was received by the BotSink 112, i.e. an ARP message received by the BotSink 112 that is not in response to an ARP request broadcast by the BotSink 112. An ARP request may be determined 314 to be gratuitous if the sender IP address and the target IP address in the ARP header of the request are the same as the IP address of the host that sent the ARP request. Step 314 may be performed each time an ARP message is received by the BotSink 112 on the subnet. The gratuitous request may be receieved from a legitimate server 204, such as a gateway server or other network device on the subnet, or the attacker system 110. The steps of FIG. 3B may be performed in order to detect whether the gratuitous ARP request is legitimate.

If a gratuitious ARP request is determined 314 to have been received, then the BotSink 112 may send 316 an ARP request for the IP address of the server 204, such as a request for the gateway server or some other server offering some other network service. Requests according to step 316 may be transmitted at random intervals to appear as production traffic. The legitimate server 204 responds 318 to the request with its IP address. The attacker system 110 may also respond 320 to the ARP request with its IP address.

If multiple responses are determined 322 to have been received to the request of step 316, such as in the sama manner as step 310 of FIG. 3A, then a MITM attack is flagged 324, such as in the same manner as step 312 of FIG. 3A and remedial action is taken with respect to the attacker system 110 in the same manner as described above with respect to step 312.

If multiple responses are not determined 322 to have been received, then the method 300 may include evaluating 326 whether the response to the request of step 316 is different from the gratuitous request determined to have been received at step 314. In particular, step 326 may include determining whether a MAC address of the response of step 314 is different from the MAC address of the response of step 322.

If the MAC addresses of the responses of steps 314 and 322 are the same, then the gratuitous response of step 314 may be determined to be legitimate. If the MAC addresses of the responses of steps 314 and 322 are determined to be different, then step 324 is performed with the source of the response of step 322 being the source of the MITM attack.

Figure 3D:
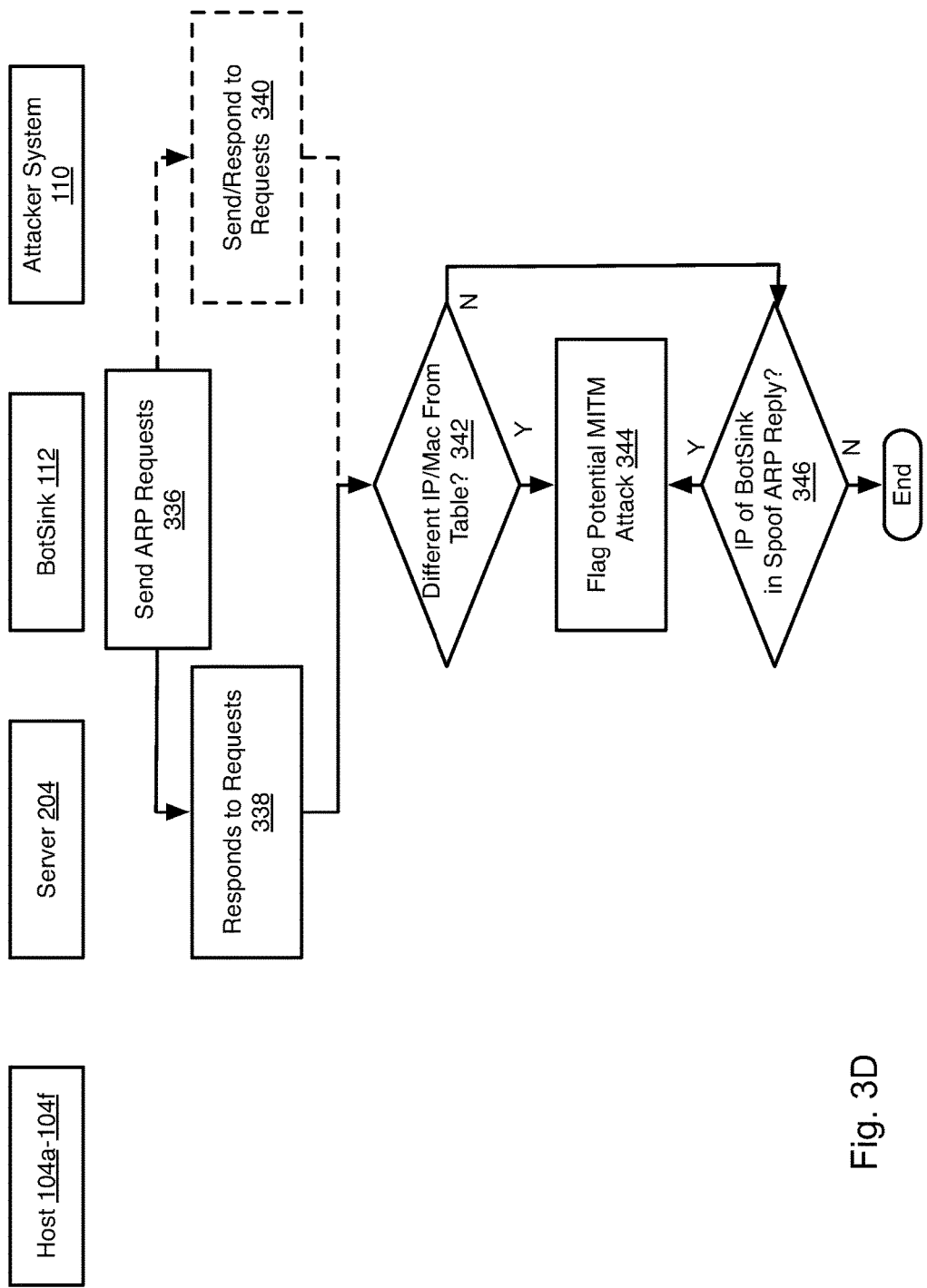

FIGS. 3C and 3D, illustrate steps that may be performed to passively detect MITM attacks that exploit ARP messages. Hosts 104a-104f of the subnet send 328 ARP requests and the server 204 of the subnet responds 330 with its IP address. The BotSink 112 monitors these requests and builds 332 an IP-MAC table that relates IP addresses to MAC addresses. Specifically, the responsees of step 330 include the IP address of the legitimate server 204 and its MAC address. Accordingly, for each response detected, the BotSink 112 creates an entry in the IP-MAC table that includes the IP address and MAC address of the response. Likewise, ARP requests sent by hosts may include an IP address and MAC of the hosts, which are also added to the IP-MAC table.

The binding between an IP address and a MAC may change due to the operation of DHCP. Accordingly, the BotSink 112 also monitors DHCP packets. If a DHCP packet is detected that updates 334 the IP address for a MAC, then the new IP address is added to the entry in the IP-MAC table corresponding to that MAC.

Referring to FIG. 3D, the BotSink 112 may send 336 subsequent ARP requests and the server 204 responds 338 to these requests. The attacker system 110 may also respond 340 to these requests. The BotSink 112 may evaluate the responses. If a response is found 342 to have an IP Address-MAC binding that conflicts with an entry in the IP-MAC table, then a potential MITM attack is flagged 344 with the source of the response having the conflicting IP-MAC binding being the potential source of the MITM attack. Some or all of the remedial measures described herein may then be performed in response to flagging 344 the potential MITM attack.

In some instances, an attacker system 110 may attempt an ARP poison attack on an IP address acquired by the BotSink 112. In order to detect such a poison attempt, the BotSink keeps track of the ARP requests and replies from its acquired IP addresses, such as in a table wherein requests and replies generated by the BotSink 112 are recorded. If it is determined 346 that an unsolicited ARP reply is received that is in conflict with the existing IP-MAC binding in the IP-MAC table, then a potential MITM attack may be flagged 344 and any of the remedial actions described herein may be taken with respect to a source of the unsolicited reply. In particular a reply may be determined to be unsolicited if the record of issued ARP requests does not indicate transmission of an ARP request for the IP address referenced in the unsolicited reply.

Figure 4:
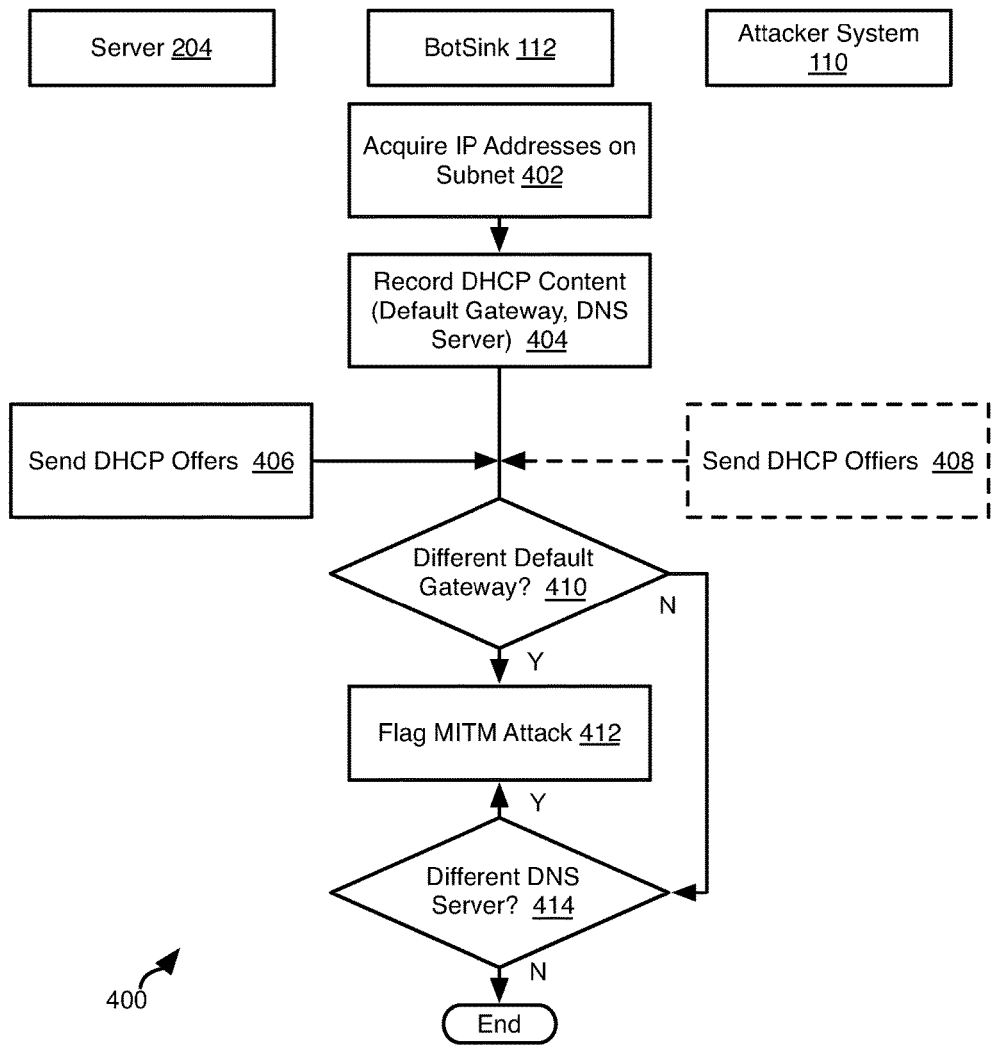
FIG. 4 is a process flow diagram of a method for detecting DHCP MITM attacks in accordance with an embodiment of the present invention.

FIG. 4 illustrates a method 400 for detecting MITM attacks using DHCP. The method 400 may be executed with respect to each subnet ("the subnet") of a plurality of subnets of a network 100. The method 400 includes acquiring 402 an IP address in the subnet. Acquiring 402 an IP address may include acquiring an IP address according to DHCP from a server 204 operating as a DHCP server. As known in the art, this may include receiving a DHCP offer from the server 204. The BotSink 112 may record 404 content of the DHCP offer, such as the default gateway and/or DNS server listed in the DHCP offer, e.g. the IP address or MAC addresses of the default gateway and/or DNS server. The recorded content of the DHCP offer may be updated in response to changes made by the DHCP server, e.g. in response to configuration of a new default gateway or DNS server.

The server 204 may broadcast other DHCP offers 406 on the subnet. The attacker system 110 may also broadcast 408 DHCP offers referencing the attacker system 110 or some other destination as the gateway server and/or DNS server.

The method 400 may include evaluating 410 each offer detected by the BotSink 112. If a DHCP offer is determined 410 to list a different IP address for the gateway server than recorded at step 404, then a MITM attack is flagged 412 with the source of the DHCP offer including the different IP address being the source of the MITM attack. Remedial action may be taken with respect to the source of the response with the different IP address. Remedial acitons may include any of the remedial actions described hereinabove.

The method 400 may further include evaluating 414 whether a response lists a different IP address for the DNS server than was recorded at step 404. If so, then a MITM attack may be flagged 412 and remedial actions may be taken with respect to the source of the response with the different IP address. Remedial actions may include any of the remedial actions described hereinabove.

Figure 5:
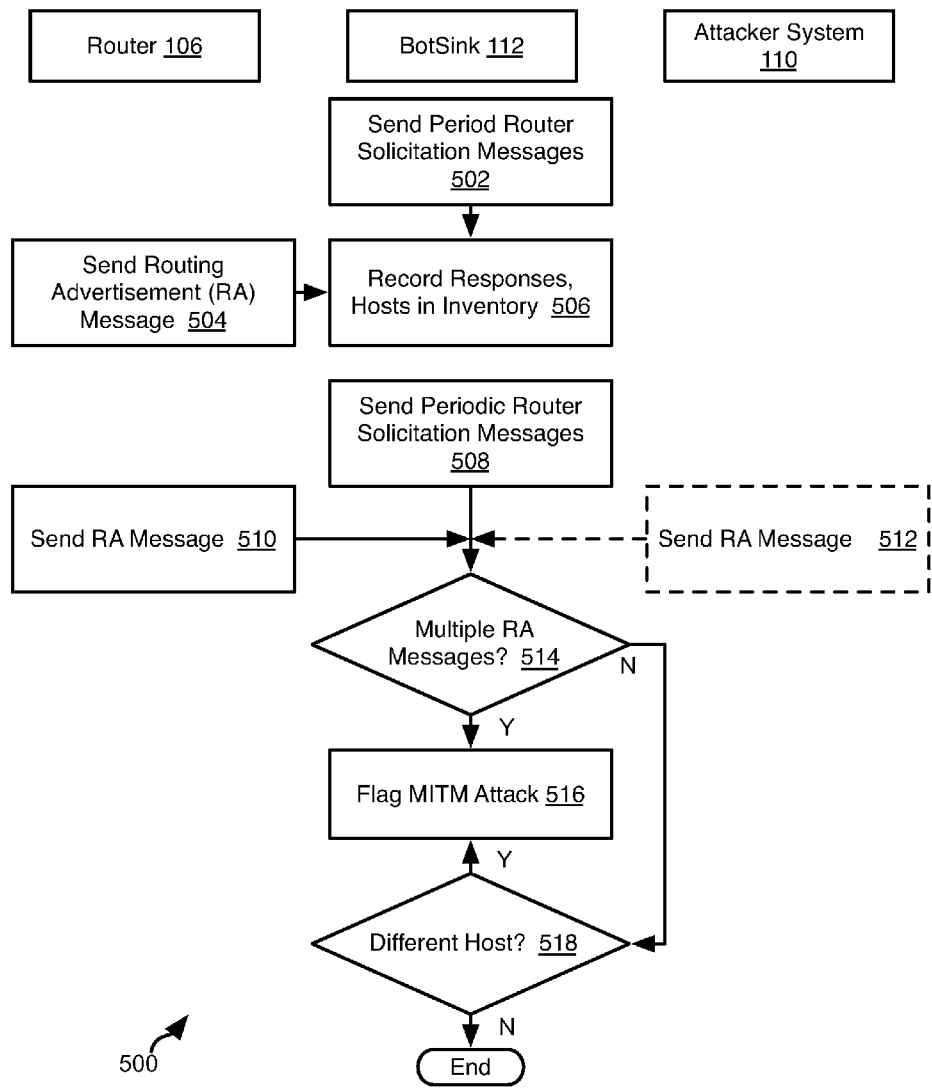
FIG. 5 is a process flow diagram of a method for detecting router impersonation MITM attacks in accordance with an embodiment of the present invention.

Referring to FIG. 5, the illustrated method 500 may be used to detect MITM attacks imitating a router. The method 500 may include sending 502, by the BotSink 112, periodic router solicitation messages. Sending 502 router solicitation messages may include sending sending router solicitation messages on some or all subnets of the network 100. Sending 502 router solicitation messages may be performed peridocially at random intervals in order to appear as production traffic. In response to the router solicitation messages, the one or more routers 106 of the network 100 will send router advertisement messages.

When a dual-protocol host joins a network, it will send an ICMPv6 (type 133) (ICMP=Internet Control Message Protocol) router solicitation message to inquire about any local IPv6 capable router on the network. Sending 502 router solicitation messages may include such a message. In response, the local router sends an ICMPv6 (type 134) routing advertisement (RA) messagae to all the nodes of the network. Sending 504 an RA message may include such an RA message.

The BotSink 112 records 506 the identity of hosts that send 504 RA messages and thereby obtains a list of the routers 106 in the network 100. In particular, the BotSink 112 may store the IP address, domain name, MAC, or other data describing the source of RA messages received by the BotSink 112.

The BotSink 112 may continue to send 508 router solication messages at random intervals, to which the legitimate routers 106 of the network 100 may continue to respond by sending 510 RA messages. An attacker system 110 may also intercept the router solicitation messages and send 512 RA messages referencing the attacker system 110.

If the BotSink 112 determines 514 that multiple RA messages are received in response to a single router solicitation message, then the BotSink 112 flags 516 a MITM attack. Step 516 may include taking any of the remedial actions mentioned herein for responding to a MITM attack. The source of the MITM attack may be the source of the RA message that includes an IP address or other host identifier that does not match the identifier of a host recorded 506 previously by the BotSink 112. Multiple responses to a single router solicitation message may be determined to be received if multiple responses are received without an intervening router solicitation message or the multiple responses being received within some threshold time period, e.g. 2 to 100 ms.

In some embodiments, even if a single RA message is received in response to a router solicitation message, if it is found 518 to reference a host that has not been previously recorded 506 by the BotSink 112, then a MITM attack may be flagged 516.

Figure 6:
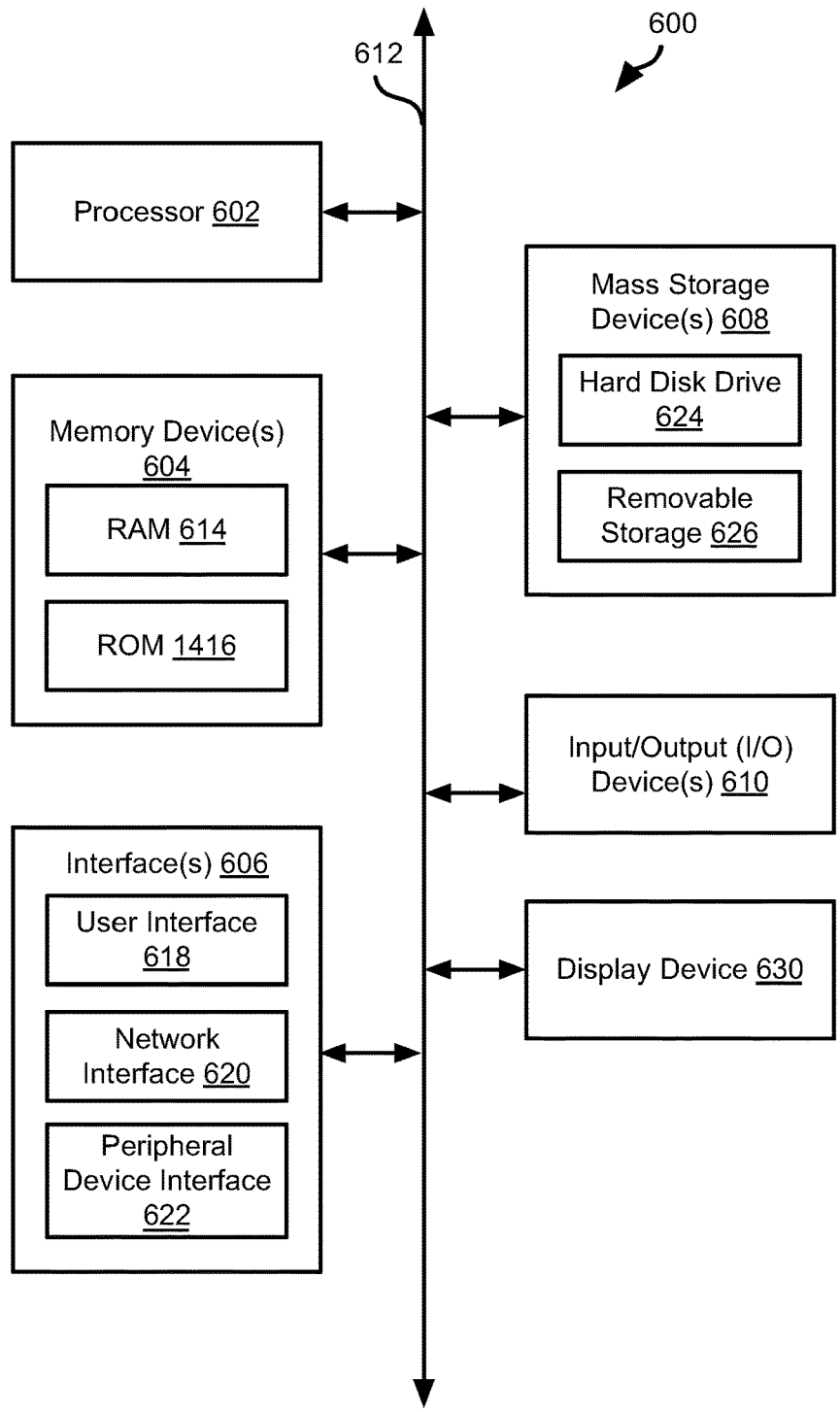
FIG. 6 is a schematic block diagram of a computer system suitable for implementing methods in accordance with an embodiment of the present invention.

FIG. 6 is a block diagram illustrating an example computing device 600 which can be used to implement the systems and methods disclosed herein. The switches 102, nodes 104a-104f, router 106, DNS server 108, attacker system 110, and BotSink 112 may have some or all of the attributes of the computing device. Computing device 600 can function as a server, a client, or any other computing entity. Computing device 600 can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed:

1. A method for detecting man-in-the-middle (MITM) attacks, the method comprising:
   monitoring, by a computer system, network configuration traffic among network devices and network management devices of one or more subnets;
   storing, by the computer system, first identification information for one or more network management devices referenced in the network configuration traffic;
   transmitting, by the computer system, on at least one of the one or more subnets, a broadcast request for network configuration information;
   detecting, by the computer system, at least one of (a) multiple responses to the broadcast request from multiple sources and (b) a response that includes second identification information that does not correspond to the first identification information; and
   in response to detecting at least one of (a) and (b), determining, by the computer system that a potential MITM attack has occurred;
   wherein the broadcast request for network configuration information is a request for a WPAD.dat file;
   wherein the first identification information includes a first WPAD.dat file;
   wherein the second identification information includes a second WPAD.dat file; and
   wherein detecting at least one of (a) and (b) comprises detecting (b);
   wherein detecting (b) comprises determining that the second WPAD.dat file is different from the first WPAD.dat file.

2. The method of claim 1, wherein:
the network configuration traffic includes at least one of Net BIOS (basic input output system) Name Service (NBNS) traffic, Link-Local Multicast Name Resolution (LLMNR) traffic, and Multicast Domain Name System (mDNS) traffic.

3. The method of claim 2, wherein detecting (a) comprises detecting responses to at least one of an NBNS request, LLMNR requests, and mDNS request from multiple internet protocol (IP) addresses.

4. The method of claim 3, wherein detecting at least one of (a) and (b) comprises detecting (b), detecting (b) further comprising:
determining, by the computer system, that the response resolves a domain name to an IP address where a previously-received response resolved a different domain name to the IP address.

5. The method of claim 3, wherein detecting at least one of (a) and (b) comprises detecting (b), (b) the method further comprising:
determining, by the computer system, that a first IP address is referenced in the network configuration traffic;
determining, by the computer system, that a second IP address in the multiple IP addresses is different from the first IP address;
in response to determining that the second IP address is different from the first IP address, determining, by the computer system, that the second IP address is a source of the potential MITM attack.

6. The method of claim 5, further comprising:
transmitting, by the computer system, fake credentials to the second IP address;
determining, by the computer system, that authentication using the fake credentials was successful; and
in response to determining that authentication using the fake credentials was successful, determining that an MITM attack has occurred.

7. The method of claim 5, further comprising:
transmitting, by the computer system, fake credentials to the second IP address;
monitoring, by the computer system, one or more logs of one or more servers among the network devices; and
determining, by the computer system, that a log of the one or more logs references the fake credentials; and
in response to determining that the log of the one or more logs references the fake credentials, determining that an MITM attack has occurred.

8. The method of claim 1, wherein transmitting the broadcast request for network configuration information comprises an address resolution protocol (ARP) request.

9. The method of claim 8, wherein storing the first identification information for the one or more network management devices referenced in the network configuration traffic comprises storing a table including a plurality of entries, each entry of the plurality of entries mapping an internet protocol (IP) addresses and machine access code (MAC) pair;
wherein detecting at least one of (a) and (b) comprises detecting (b);
wherein detecting (b) comprises receiving an ARP request including at least an IP address and MAC pair that conflicts with an entry of the plurality of entries.

10. The method of claim 1, wherein storing the first identification information for the one or more network management devices referenced in the network configuration traffic comprises storing, for each subnet of the one or more subnets, a first default gateway referenced in one or more dynamic host configuration protocol (DHCP) offers transmitted on the each subnet;
wherein detecting at least one of (a) and (b) comprises detecting (b);
wherein detecting (b) comprises detecting a DHCP offer on a first subnet of the one or more subnets referencing a second default gateway that is different from the first default gateway stored for the first subnet.

11. The method of claim 1, wherein storing the first identification information for the one or more network management devices referenced in the network configuration traffic comprises storing, for each subnet of the one or more subnets, a first domain name service (DNS) server referenced in one or more dynamic host configuration protocol (DHCP) offers transmitted on the each subnet;
wherein detecting at least one of (a) and (b) comprises detecting (b);
wherein detecting (b) comprises detecting a DHCP offer on a first subnet of the one or more subnets referencing a second DNS server that is different from the first DNS server for the first subnet.

12. The method of claim 1, wherein the network configuration traffic comprises first router advertisement messages;
wherein transmitting the broadcast request for network configuration information comprises transmitting a router solicitation message;
wherein detecting at least one of (a) and (b) comprises detecting (a);
wherein detecting (a) comprises receiving more than one response to the router solicitation message.

13. A system for detecting man-in-the-middle (MITM) attacks, the system comprising one or more processors and one or more memory devices coupled to the one or more memory devices, the one or more memory devices storing executable code effective to cause the one or more processors to:
monitor network configuration traffic among network devices and network management devices of one or more subnets;
store first identification information for one or more network management devices referenced in the network configuration traffic;
transmit, on at least one of the one or more subnets, a broadcast request for network configuration information;
detect (a) multiple responses to the broadcast request from multiple sources and (b) a response that includes second identification information that does not correspond to the first identification information; and
if at least one of (a) and (b) are detected, determine that a potential MITM attack has occurred;
wherein the broadcast request for network configuration information is a request for a WPAD.dat file;
wherein the first identification information includes a first WPAD.dat file;
wherein the second identification information includes a second WPAD.dat file; and
wherein the executable code is further effective to cause the one or more processors to detect (b) by detecting that the second WPAD.dat file is different from the first WPAD.dat file.

14. The system of claim 13, wherein:
the network configuration traffic includes at least one of Net BIOS (basic input output system) Name Service (NBNS) traffic, Link-Local Multicast Name Resolution (LLMNR) traffic, and Multicast Domain Name System (mDNS) traffic;
wherein the executable code is further effective to cause the one or more processors to detect (a) by detecting responses to at least one of an NBNS request, LLMNR requests, and mDNS request from multiple internet protocol (IP) addresses.

15. The system of claim 14, wherein the executable code is further effective to cause the one or more processors to:
determine that a first IP address is referenced in the network configuration traffic;
if a second IP address in the multiple IP addresses is different from the first IP address, determine that the second IP address is a source of the potential MITM attack.

16. The system of claim 15, wherein the executable code is further effective to cause the one or more processors to:
transmit fake credentials to the second IP address;
if authentication using the fake credentials was successful, determine that an MITM attack has occurred.

17. The system of claim 15, wherein the executable code is further effective to cause the one or more processors to:
transmit fake credentials to the second IP address;
monitor one or more logs of one or more servers among the network devices; and
if a log of the one or more logs references the fake credentials, determine that an MITM attack has occurred.

18. The system of claim 13, wherein the executable code is further effective to cause the one or more processors to transmit the broadcast request for network configuration information by transmitting an address resolution protocol (ARP) request.

19. The system of claim 18, wherein the executable code is further effective to cause the one or more processors to store the first identification information for the one or more network management devices referenced in the network configuration traffic by storing a table including a plurality of entries, each entry of the plurality of entries mapping an internet protocol (IP) addresses and machine access code (MAC) pair;
wherein the executable code is further effective to cause the one or more processors to detect (b) by receiving an ARP request including at least an IP address and MAC pair that conflicts with an entry of the plurality of entries.

20. The system of claim 13, wherein the executable code is further effective to cause the one or more processors to store the first identification information for the one or more network management devices referenced in the network configuration traffic comprises storing, for each subnet of the one or more subnets, a first default gateway referenced in one or more dynamic host configuration protocol (DHCP) offers transmitted on the each subnet;
wherein the executable code is further effective to cause the one or more processors to detect (b) by detecting a DHCP offer on a first subnet of the one or more subnets referencing a second default gateway that is different from the first default gateway stored for the first subnet;
wherein the executable code is further effective to cause the one or more processors to store the first identification information for the one or more network management devices referenced in the network configuration traffic comprises storing, for each subnet of the one or more subnets, a first domain name service (DNS) server referenced in one or more dynamic host configuration protocol (DHCP) offers transmitted on the each subnet;
wherein the executable code is further effective to cause the one or more processors to detect (b) by detecting a DHCP offer on a first subnet of the one or more subnets referencing a second DNS server that is different from the first DNS server for the first subnet.

* * * * *